United States Patent

[11] 3,628,874

| [72] | Inventor | Luc A. Tagnon |
| | | Saint-Mande, France |
| [21] | Appl. No. | 16,872 |
| [22] | Filed | Mar. 5, 1970 |
| [45] | Patented | Dec. 21, 1971 |
| [73] | Assignee | Societe Des Lunetiers |
| | | Paris, France |
| [32] | Priority | Mar. 12, 1969 |
| [33] | | France |
| [31] | | 6906971 |

[54] COMPACT OPTICAL SIGHTING LEVEL WITH INTERNAL FINE SETTING OF THE HORIZONTALITY OF THE LINE OF SIGHT
4 Claims, 2 Drawing Figs.

[52] U.S. Cl. ................................................. 356/249,
350/16, 356/250
[51] Int. Cl. ................................................. G01c 9/12,
G01c 9/24
[50] Field of Search .......................................... 356/249,
250, 255, 143, 149, 248; 350/16, 53, 49

[56] References Cited
UNITED STATES PATENTS
3,013,464  12/1961  Keuffel et al. ................  356/250

OTHER REFERENCES
" The Optician" (Reflecting Prisms) Vol. 143, No. 3715, June 15, 1962 p. 590

Primary Examiner—Ronald L. Wibert
Assistant Examiner—Orville B. Chew, II
Attorneys—Robert E. Burns and Emmanuel J. Lobato ABSTRACT: An automatic optical sighting level comprising a lens system, a mirror controlled by the vertical and disposed at a distance F/2 from said lens system, for reflecting the incoming light beam in a vertical direction, a conventional-type divergent vehicle movable along the vertical, a cross-wire and an observation eyepiece, characterized in that a fixed Abbe prism from which the last 60° reflection has been cut off is interposed between said vehicle and said cross-wire, so that it will eventually reflect the light beam along an axis inclined by 30° above the horizontal. The mirror is controlled for vertical alignment by adjusting same with the assistance of an air-bubble or spirit-level rigid with the support of said mirror, whereby a relatively rapid level measurement can be effected by simply bringing the instrument rapidly into an approach or rough sighting position by centering the bubble of a spherical level.

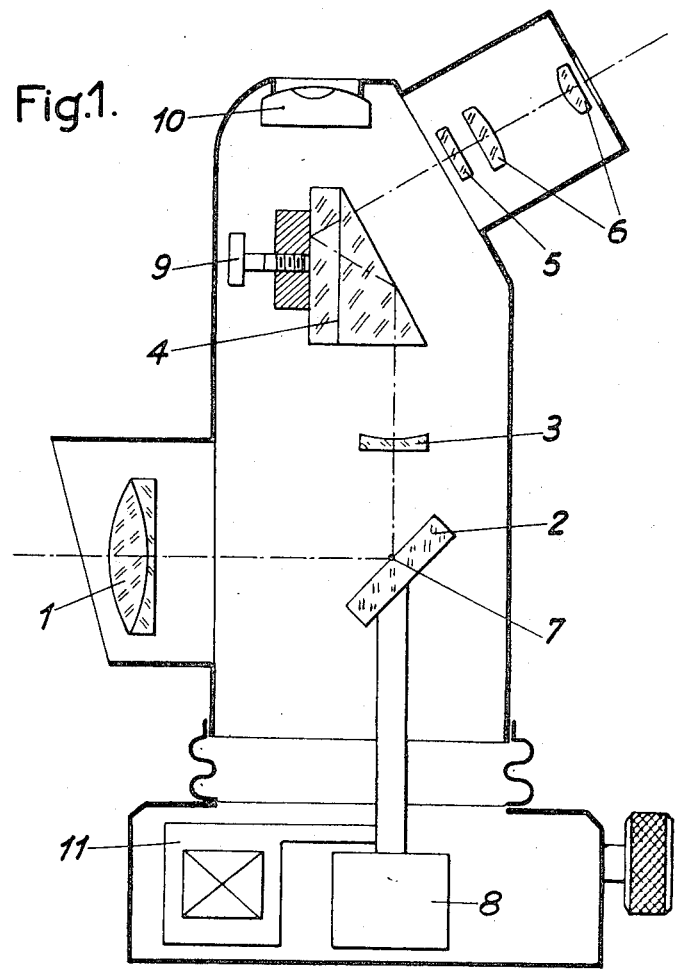
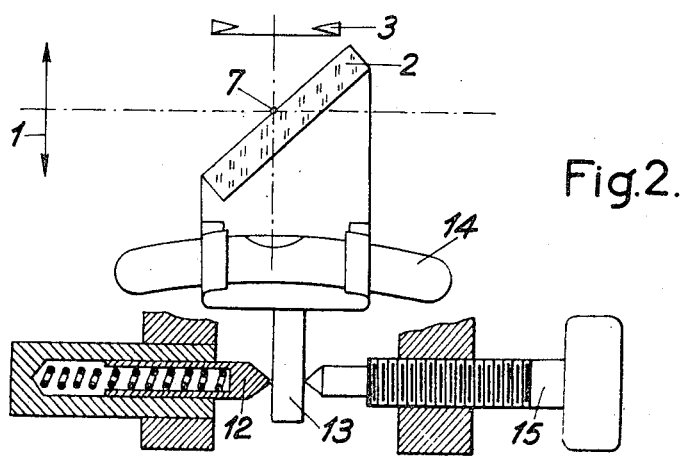

3,628,874

COMPACT OPTICAL SIGHTING LEVEL WITH INTERNAL FINE SETTING OF THE HORIZONTALITY OF THE LINE OF SIGHT

BACKGROUND OF THE INVENTION

Many different types of automatic optical sighting levels are already known wherein the vertical controlled element is a lens, a mirror, a prism, etc... incorporated in the sighting eyepiece or telescope. As a rule, the vertical control action is obtained by using a pendular suspension of said element according to one of the many well-known methods and means.

The solutions proposed heretofore to this problem are generally complicated and therefore expensive, and in most instances the construction is fragile; they lead to abnormally costly instruments for current use, which contrasts with the normal scope of automatic levels.

In a prior French Pat. No. 1,471,186 the applicants describes a compact, relatively small-sized optical level structure, which is sturdy and accurate, and operable either automatically by using notably a pendulum oscillating about an axis for bringing the prism under the control of the vertical, or manually by simply rotating the prism about the same axis, according to the date supplied by an air-bubble or spirit-level rigid with the prism support.

This solution is satisfactory; the air-level and reflecting member assembly thus suspended in a pendular fashion, as explained hereinabove, gives very good results, but requires a left-right image rectification, thus making it compulsory to use a roof-shaped prism; however, as this prism is located at a relatively great distance from the eyepiece, it must necessarily be of high quality in order to avoid any image alteration.

This roof-shaped prism is an expensive component and therefore this arrangement is not desirable in the case of a popular-type optical level.

SUMMARY OF THE INVENTION

It is the essential object of the present invention to provide an automatic optical sighting level comprising an objective lens system, a mirror disposed between the objective lens system and its focus point at a distance F/2 from said lens system, for reflecting the incoming light beam in a vertical direction, a conventional-type divergent lens movable vertically, a cross-wire and an observation eyepiece, characterized in that a fixed prism from which the last 60° reflection has been cut off is interposed between said divergent lens and said cross-wire, so that it will eventually reflect the light beam along an axis inclined by 30° above the horizontal. The mirror is tiltable about a transverse horizontal axis and is controlled for vertical alignment by adjusting same with the assistance of an air-bubble or spirit-level rigid with the support of said mirror, whereby a relatively rapid level measurement can be effected by simply bringing the instrument rapidly into an approach or rough sighting position by centering the bubble of a spherical level.

BRIEF DESCRIPTION OF THE DRAWING

The invention will be better understood if reference is made to the attached drawing illustrating diagrammatically by way of example a typical form of embodiment thereof. In the drawing:

FIG. 1 illustrates in diagrammatic form the relative disposal of the main component elements of the instrument; and FIG. 2 is another diagrammatic view showing the manual adjustment of the mirror in relation to the vertical.

DESCRIPTION OF THE PREFERRED EMBODIMENT

The automatic optical level illustrated in the drawing comprises notably a lens system 1, a mirror 2 disposed at a distance F/2 from this lens system so as to reflect the sighting beam axis upwards and vertically, and a vehicle 3. The mirror 2 is mounted for rotation about an axis perpendicular to the optical axis of the lens system 1 and the beam reflected by the mirror at their intersection point on the reflecting surface of the mirror. A vertically movable divergent lens 3 is mounted above the mirror 2 with its optical axis perpendicular to the optical axis of the lens system 1 at its intersection point with the surface of the mirror 2. The plane containing the intersecting optical axes of the lens system 1 and the movable divergent lens 3 is vertical when the level is set in its normal position for use. A prism 4 mounted above the lens 3 has reflecting surfaces for the beam from the lens 3 first upwardly and forwardly at an angle of 60° to the horizontal and then upwardly and rearwardly at an angle of 30° to the horizontal. The second reflection is produced by a roof-shaped second reflecting surface of the prism so as to reverse the image from side to side. A cross-wire 5 is located at the focus point of a conventional eyepiece 6, the optical axis of which coincides with the beam reflected by said second reflecting surface of the prism 4. Means is provided for adjusting the position of the mirror about its axis of rotation so as to keep the sighting in a true horizontal position. In the embodiment illustrated in FIG. 1, the means for positioning the mirror is a pendulum 8 which, as will be described more full below, adjusts the position of the mirror automatically. An Abbe prism 4 of which the last 60° reflection is cut.

This positioning of the mirror 2 may be obtained manually (FIG. 2) by effecting an adjustment guided by an air-bubble or spirit-level 14 rigid with the mounting or support of said mirror 2 and adapted to rotate about the axis 7 of the mounting or support. The base member 13 of the mirror and level assembly is retained for example between the outer end of a plunger 12 consisting of a rod urged towards the base member 13 by a spring and the end of a screw 15 adapted to the rotated by means of its knurled head projecting from the casing of the apparatus.

Before the sighting operation proper, the sighting position is approached by using a spherical bubble-level 10 disposed at the top of the instrument; then, the bubble of the main air level 14 is brought between its marks by turning the knurled head of the screw 15, so that the prism 2 and air level 14 are rotated about the axis 7. When the bubble is properly centered, the sighting operation is effected as if the axis of the optical level were horizontal.

The servoaction may also be obtained automatically by using a pendulum. In this case the mirror 2 (FIG. 1) is adapted to rotate freely about the axis 7, for example by means of ball bearings, and is rigid with a pendulum 8 the oscillations of which are damped out by using a frictionless magnetic device of known type, which is shown at 11.

The initial or rough approach or adjustment performed by using the spherical top level 10 will free the pendulum 8 and set the sighting axis automatically in an accurate horizontal position. Anyone of the many known pendulum-locking means may be used, of course, without departing from the scope of the invention.

The approach or rough adjustment of the automatic version and of the manual version of this instrument may be effected by using any known and suitable devices such as ball-joints, wedging screw or, better still, by using a particularly rapid orthogonal system described and illustrated in a previous application of the same applicant, according to the data given by a spherical bubble-level mounted on the casing.

This invention is attended by many advantageous features:

The inclined or roof face of prism 4 is nearer to eyepiece 5; therefore, a prism of current grade can be used, thus reducing appreciably the cost of the instrument;

This instrument, due to its very specific design characteristics, had relatively small overall dimensions while preserving a high standard of optical and mechanical quality; it is light in weight yet sturdy, an important feature for an optical level to be used intensively;

Due to the particular position and inclination of the eyepiece 6 (30° above the horizontal), this instrument is more convenient to use, the operator having a more natural body position; moreover, according to the specific use contemplated, the instrument can be disposed at a lower level;

The optical adjustment is both simple and stable; the lens system 1 and cross-wire 5 are mounted within the body of the apparatus, without any intermediate member for performing said adjustment;

The initial adjustment is performed by moving the rectifying prism by means of the screw 9 enclosed in the casing of the instrument;

The first or rough approach is a simple operation since it is performed by using the top spherical level 10 independent of the pendulum.

It will readily occur to those conversant with the art that many modifications and variations may be brought to the specific form of embodiment of the invention which is shown and described herein, without departing from the basic principles of the invention.

What I claim is:

1. An optical sighting level comprising an objective lens system of which the focal distance is F, a mirror disposed between the lens system and its image focus point at a distance F/2 from said focus point and adapted to reflect in an upward direction the light beam having passed through said objective lens system, a vertically movable divergent lens disposed above said mirror with its optical axis perpendicular to the optical axis of said lens system at its intersection point with the reflecting surface of said mirror, the plane containing said two optical axes being vertical when the level is set in its sighting position, a prism reflecting in said vertical plane the optical axis of said movable divergent lens, firstly upwards and forwards by an angle of 60°, and secondly upwards and backwards by an angle of 120°, said second reflection being produced by a roof-shaped second reflecting surface of said prism to reverse the observed image from side to side, an eyepiece of which the optical axis is coincident with said twice bent axis of said movable divergent lens, a cross-wire located at the focus point of said eyepiece, and means to adjust the position of said mirror around an axis perpendicular to said objective axis and to said movable lens axis at their intersection point on the reflection surface of said mirror, so as to keep the sighting in a true horizontal direction.

2. An optical sighting level as set forth in claim 1, wherein said means for adjusting the position of said mirror operate automatically and comprise a pendulum member carrying said mirror and means for damping out the oscillations of said pendulum in a frictionless manner.

3. An optical sighting level, as set forth in claim 1, wherein said means for adjusting the position of said mirror comprise a bubble level rigid with said mirror and an adjustment screw for setting the inclination of said mirror according to the reading of said level.

4. An optical sighting level, as set forth in claim 1, comprising a casing and a spherical level at the top of said casing for initial coarse positioning of said level in preparation for fine setting by adjustment of said mirror.

* * * * *